United States Patent [19]

Yamamoto et al.

[11] Patent Number: 4,720,718
[45] Date of Patent: Jan. 19, 1988

[54] REFLEX CAMERA

[75] Inventors: Katsuhiko Yamamoto; Takeshi Yoshino; Masayoshi Hirai; Shiro Hashimoto; Michihiro Shiina; Shigenori Goto, all of Saitama; Hisashi Hamada, Tokyo, all of Japan

[73] Assignee: Fuji Photo Film Co., Ltd., Kanagawa, Japan

[21] Appl. No.: 12,656

[22] Filed: Feb. 9, 1987

[30] Foreign Application Priority Data

| Feb. 7, 1986 [JP] | Japan | 61-25563 |
| Feb. 7, 1986 [JP] | Japan | 61-25564 |
| Feb. 7, 1986 [JP] | Japan | 61-25565 |
| Feb. 10, 1986 [JP] | Japan | 51-25925 |

[51] Int. Cl.⁴ ............................................. G03B 19/12
[52] U.S. Cl. ....................................... 354/154; 354/152
[58] Field of Search ................................ 354/152, 154

[56] References Cited

U.S. PATENT DOCUMENTS 4,443,083  4/1984  Nakano ...................... 354/152

Primary Examiner—Michael L. Gellner
Attorney, Agent, or Firm—Young & Thompson

[57] ABSTRACT

A reflex camera having a reflex mirror and a light-blocking plate which are pivotally mounted for swinging movement so as to move between a viewing position and a photographing position. The reflex camera has a driving mechanism including an electric motor for causing the swing-up and -down movement of the reflex mirror and the light-blocking plate between the above-mentioned two positions, and a position-detecting device to detect the moved positions of the reflex mirror and the light blocking plate so as to control the speed of rotation of the electric motor according to the detected positions, thereby to prevent shocks and vibrations on the reflex mirror and the light-blocking plate.

10 Claims, 6 Drawing Figures

REFLEX CAMERA

BACKGROUND OF THE INVENTION

The present invention relates to a reflex camera with a motor driven reflex mirror movable between a viewing position and a photographing position, and more particularly relates to a reflex camera in which a motor driven reflex mirror is controlled in motion in accordance with its position.

Reflex cameras, as is well known, have a movable reflex mirror (which is hereinafter referred to as a mirror for simplicity) for reflecting light from a subject to a focussing screen of a viewing system. The mirror is adapted to move to a photographing position wherein the mirror is out of the light path of the camera to allow a film in the camera to be exposed.

As a well-known reflex camera, there is a large format of reflex cameras using 120-type film in which a between-the-lens shutter is incorporated therein. In this camera, because the between-the-lens shutter is open when viewing, it is necessary to provide a light-blocking plate between the mirror and an exposure aperture in order to prevent the film from being exposed to stray light. The mirror and light-blocking plate are first swung up to a photographing position after the between-the-lens shutter has been closed as a result of a shutter release operation, then the between-the-lens shutter is again opened and closed to complete an exposure. After the completion of exposure, the swung-up light-blocking plate and mirror return, in this order, to their original or viewing position wherein the mirror can reflect light from a subject to a fucusing screen for focusing and framing, and then the between-the-lens shutter is again opened, creating a viewfinder system for focusing and framing.

In the above-described type of reflex camera, it is known to use an incorporated electric motor for swinging up and down the mirror and the light-blocking plate in sequence. Such a motor-driven mirror and light-blocking plate can avoid the provision of spring means for creating a driving force for a reflex mirror with its associated members which requires to be biased by a manually operable mechanism. Therefore, the provision of the electric motor makes it possible to provide a simple and compact camera mechanism.

In the case of using the motor-driven mirror and light-blocking plate, there is an interlocking mechanism between the electric motor, and the mirror and light-blocking plate for sequentially controlling the swinging up and down movement of the mirror and light-blocking plate. This interlocking mechanism considerably reduces the load exerted on the motor upon starting and distributes the load timewise, thereby leveling the load on the motor so that the motor is driven with a relatively uniform speed of rotation. As a result, the light-blocking plate can be swung up and down with considerably reduced vibration and shock.

A problem with which conventional reflex cameras with motor-driven mirror and light-blocking plate is attended is that the motor should be controlled precisely to stop according to moved positions of the mirror and the light-blocking plate. For this reason, there is provided in the camera means for detecting the position of the mirror, which comprises a photosensor adapted to detect the mirror itself. In order to detect the mirror in the viewing position and also in the photographing position, it is necessary to provide two position-sensing devices, one for each position. If the light-blocking plate must also be detected as to its position, then at least two more position-sensing devices are required. These position-sensing devices have to be precisely positioned relative to the positions in which the mirror and the light-blocking plate are to be stopped. Therefore, a camera with such position-sensing devices is difficult to assemble.

Another problem is that, although it is desirable to move the mirror and the light-blocking plate in sequence in such a way that the motor is subjected to only a small load upon starting and a distributed load timewise, the motor upon starting is apt to be subjected to sharp loads in the case of the sequential application of load to the motor for moving the mirror and the light-blocking plate. Specifically, if the light-blocking plate is moved after the completion of the movement of the mirror, the motor increases its speed of rotation at the end of the mirror movement because the load is released from the motor. Consequently, when the motor rotates with increased speed to move the light-blocking plate, there is apt to arise shock and vibrations in the motor. Furthermore, if it is attempted to move the mirror and the light-blocking plate as soon as the motor starts, their movement is actually apt to be intermittent because of the low torque of the motor at starting, resulting in undesirable vibrations of the mirror and the light-blocking plate.

These vibrations of the mirror and/or the like result in unintended movements of the camera, such as continuously making exposures. In order to avoid these vibrations of the mirror and/or the like, there is provided in the camera a mechanical braking or anti-shake device. However, such a mechanical device is not sufficiently effective in a camera with a motor-driven mirror and light-blocking plate.

OBJECTS OF THE INVENTION

It is, therefore, an object of the present invention to provide a reflex camera in which there are a reduced number of position-sensing devices which can detect the moved positions of a reflex mirror and a light-blocking plate to provide position signals with which the motor is controlled to swing up and down the mirror and the light-blocking plate between a viewing position and a photographing position.

It is another object of the present invention to provide a reflex camera which has a motor control means which can control the motor to swing up and down a mirror and/or a light-blocking plate in sequence without producing vibrations and shocks.

It is still another object of the present invention to provide a reflex camera which has a motor control means which can control the motor to swing up a mirror and/or a light-blocking plate without vibrations and shocks, in particular, just before starring an exposure so as to avoid an unintended movement of the reflex camera.

SUMMARY OF THE INVENTION

In accordance with the present invention a reflex camera is provided with a mirror and a light-blocking plate swung up and down sequentially between a photographing and a viewing position in cooperation with a driving means such as a rotary disk which is driven to rotate by an electric motor, and with a position-detecting means comprising a member fixed to the driving means at a particular position thereof and a sensing means stationarily located in the camera for detecting the fixed member to provide position signals corresponding to moved positions of the mirror and the light-blocking plate. According to the position signals, the electric motor is controlled to rotate with a variable speed. As the swinging up and down movement of each of the mirror and the light-blocking plate is effected in association with the rotation of the driving means, moved positions of the mirror and the light-blocking plate can be detected based on the angular positions of the driving means. The provision of the driving means makes it possible to detect moved positions of the mirror and the light-blocking plate by the use of common position-detecting devices, resulting in a decreased number of position-detecting devices.

According to a feature of the present invention, the electric motor is driven by a driving voltage changing in accordance with the detected angular positions of the driving means. When swinging down the mirror from the photographing position to the viewing position, the driving voltage is controlled to decrease gradually to and be maintained at a predetermined level of voltage, and is cut off at the end of the swinging-down movement of the mirror. When swinging up the mirror and the light-blocking plate from the viewing position and the photographing position, the driving voltage is controlled to increase gradually to and be maintained at a predetermined level of voltage for swinging up the mirror, to be cut off at the end of the swinging-up movement of the mirror, again to increase gradually to and be maintained at a predetermined level of voltage for swinging up the light-blocking plate, and then to be cut off at the end of the swinging-up movement of the light-blocking plate.

Due to the driving voltage for the motor being gradually decreased to a predetermined level of voltage, the mirror can be swung down to the viewing position with a decreasing speed of movement at first and then with a stable, relatively slow speed of movement so as to avoid vibrations and shocks upon swinging down the mirror to the viewing position. On the other hand, due to the driving voltage for the motor which is gradually increased to a predetermined level of voltage, the motor can start with a balanced speed of rotation so as to provide a smooth swing-up movement of the mirror and the light-blocking plate, without producing any vibration and shock. Furthermore, as the motor is temporarily stopped at the end of the swinging-up movement of the mirror, there is no intermittent change of load exerted on the motor at the transition from movement of the mirror to movement of the light-blocking plate. As a result, there are induced no vibrations or shocks during swinging-up movement of the mirror and of the light-blocking plate.

According to another feature of the present invention, the electric motor is driven by a driving voltage which is lower when swinging the light-blocking plate than when swinging the mirror. This is due to the fact that the electric motor requires a driving torque for the mirror larger than for the light-blocking plate, and that vibrations are apt to be produced just before commencing exposures owing to the movement of the light-blocking plate rather than of the mirror. This voltage control for the motor ensures that the mirror can swing at a moderate speed and that the light-blocking plate can swing up smoothly to and stop at the photographing position without vibrations and shocks.

BRIEF DESCRIPTION OF THE DRAWINGS

Other objects and advantages of the present invention will become apparent when the following detailed description of a preferred embodiment is read in conjunction with the accompanying drawings, wherein.

DETAILED DESCRIPTION OF THE INVENTION

Figure 1:
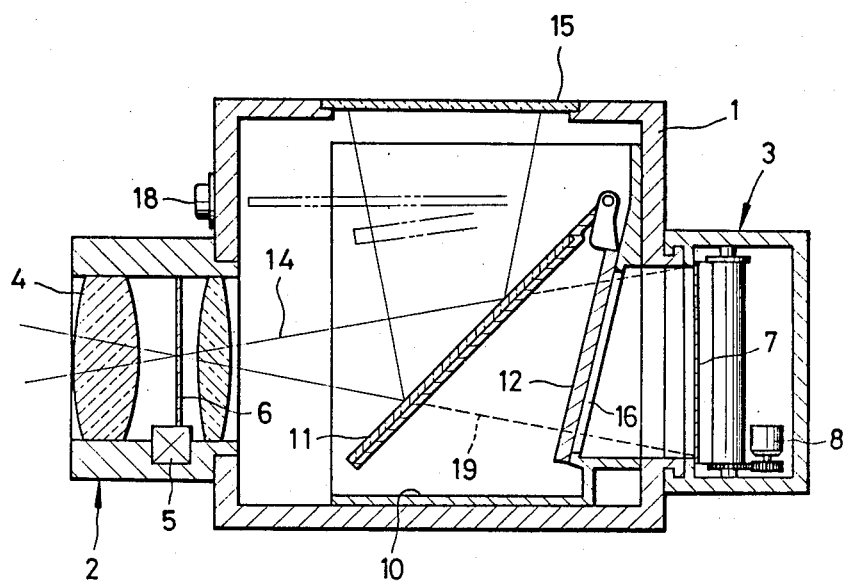
FIG. 1 is a schematic view of a reflex camera embodying the present invention.

Referring now to FIG. 1, shown therein is the basic structure of a reflex camera embodying the present invention, wherein there is a light-tight, box-shaped camera housing 1 on which a taking lens unit 2 and a film back 3 are detachably mounted in a light-tight fashion. In the lens unit 2 there are a taking lens system 4 supported for axial movement so as to focus an image on a film 7 in the film back 3 and a shutter 6 whose opening and closing motion is caused by driving means 5 including a control circuit which is adapted to be electrically coupled in a manner well known in the art to control means in the camera housing 1 upon the mounting of the lens unit 2 so as to perform control signal exchanges. The film back 3 is provided with a film advancing motor 8 therein which is also adapted to be electrically coupled in a manner well known in the art to the control means in the camera housing 1 upon the mounting of the film back 3 so as to perform control signal exchanges for one-frame advancement of the film 7.

In the camera housing 1 there is a fixed mirror box 10 wherein a reflex mirror 11 and a light-blocking plate 12 are supported for swing-up and -down movement between a viewing position and a photographing position. The viewing position is the position wherein the mirror 11 reflects light from the subject to be photographed toward a focusing screen 15 of a viewing system of the camera as shown in FIG. 1 for allowing accurate focusing and framing and wherein the light-blocking plate 12 covers an opening to block stray light so as to prevent the film 7 from being unintentionally exposed; and the photographing position, shown in phantom line in FIG. 1, is the position wherein the mirror 11 and the light-blocking plate 12 allow light from the subject to reach the film 7. In the viewing position the light-blocking plate covers the opening defining an exposure aperture 16 formed in a rear wall of the mirror box 10 in front of the film 7 so as to block stray light from the film 7.

Figure 2:
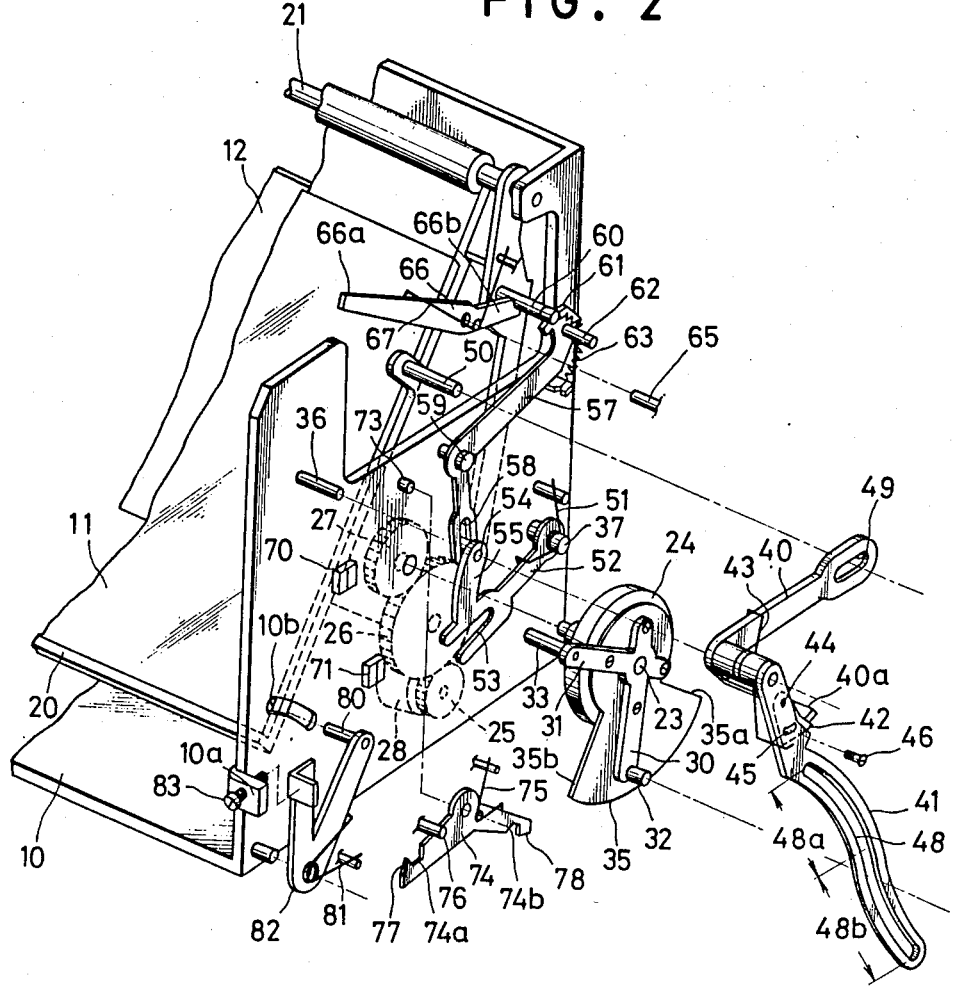
FIG. 2 is an exploded perspective view showing an example of driving mechanism for a mirror and a light-blocking plate.

Referring now to FIG. 2 showing a driving mechanism for the mirror 11 and the light-blocking plate 12, a frame 20 supporting the mirror 11, and the light-blocking plate 12 are independently pivotally mounted on a shaft 21 supported on the mirror box 10 for swing-up and -down movement. On one side wall of the mirror box 20 there is a driving disk 24 supported thereon for rotational movement about a shaft 23. The driving disk 24 is coupled to a motor 28 through a train of gears 25, 26 and 27 all of which are installed inside the mirror box 10. Provided on arms 30 and 31 integrally attached to the driving disk 24 are engaging pins 32 and 33 extending in opposite directions from each other, these engaging pins 32 and 33 being adapted to move the mirror 11 and the plate 12, respectively. The driving disk 24 is further provided with signaling means such as a sector member 35 made of a metal such as aluminum with a high reflectivity.

Figure 3:
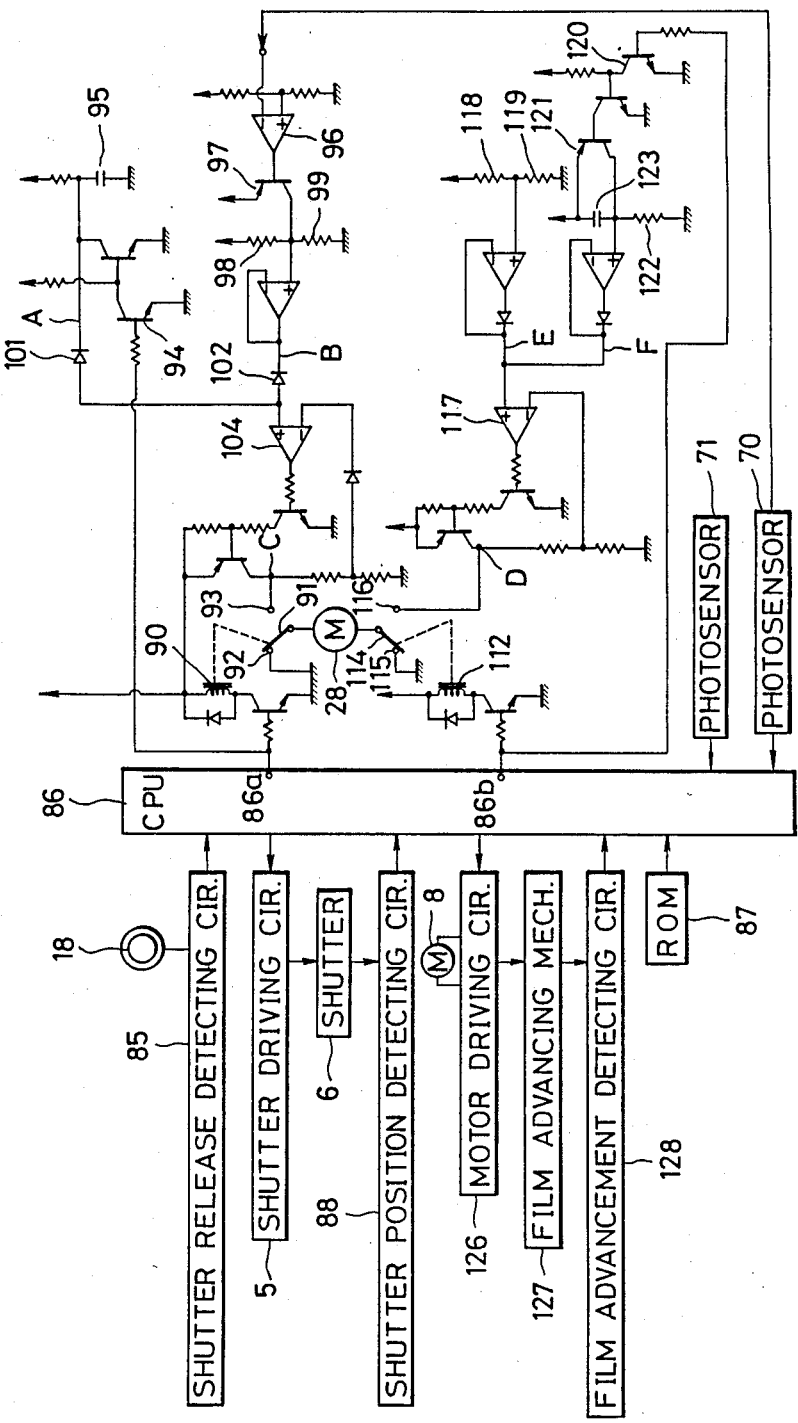
FIG. 3 is a functional block diagram showing an example of a motor control circuit used in association with the reflex camera of FIG. 1.

There are attached to the mirror box 10 on said one side wall thereof shafts 36 and 37 one shaft 36 of which is provided with a mirror swinging lever 40 and a control cam lever 41 mounted thereon for pivotal movement. These two levers 40 and 41, as is shown in FIG. 3, are coupled to each other by a spring 43 fixed between a raised lug 40a at the end of the mirror swing-up lever 40 and an adjustable sector member 42 which is supported on a shaft 44 on the control cam lever 41 for pivotal movement so as to change angularly its position and is fixed in one of its possible angular positions by fastening a set screw 46 extending through a curved slot 45 formed in the lever 41. The adjustment of position of the sector member 42 permits fixing a precisely adjusted angle between the swinging lever 40 and the cam lever 41.

In the control cam lever 41 there is formed a cam slot 48, comprising a circular arc slot 48a, the circular arc being a part of a circle having its center at the axis of rotation of the shaft 23 of the driving disk 24, and a curved slot 48b, which is engaged by the engaging pin 32 on the arm 30 for mirror swinging up and down. On the other hand, there is formed in the mirror swinging lever 40 a slot 49 which is engaged by a pin 50 fixed to the frame 20.

Mounted on the other shaft 37 for pivotal movement is a linking lever 52 which is biased in the counterclockwise direction by a spring 51 and which is formed with an open-ended slot 53 and is integrally provided with an arm 55 carrying a pin 54 engageable in a slot 58 formed at the end of a light-blocking plate swinging lever 57. The light-blocking plate swinging lever 57 which is pivotally mounted on a shaft 59, has a free end formed with an edge which is engaged by a pin 60 extending from the light-blocking plat 12. That same end of lever 57 carries a pin 62. Deflected about the pin 62 is a spring 63 which is fixed between the pin 60 and the light-blocking plate swinging lever 57.

On a shaft 65 extending from the camera body 1a locking lever 66 is mounted for pivotal movement and is biased by a spring 67 so as to turn in the counterclockwise direction. One end 66a of the locking lever 66 is in the path of movement of the pin 50 extending laterally from the frame 20, and the other end 66b thereof engages with the pin 60 to limit movement of lever 66 in the counterclockwise direction. The locking lever 66, when the mirror 11 is swung up to the photographing position shown by a double dotted line in FIG. 1, is turned in the clockwise direction by the pin 50 to release the pin 60 therefrom.

On the side wall of the mirror box 10 there are two reflection-type photosensors 70 and 71 disposed on a circle having its center at the axis of rotation of the shaft 23. As is well known in the art, each photosensor 70, 71 comprises a light-emitting section and a light-receiving section and is adapted to provide a high-level electric signal when the light-receiving section receives reflected light from the signaling sector member 35. Therefore, at the moment each edge 35a, 35b of the sector member 35 passes over the photosensors 70 and 71, the electric signal provided by each photosensor 70, 71 changes its signal lever either from low to high or from high to low. It should be noted that the photosensors 70 and 71 may be disposed at any location out of actual contact with the edges 35a and 35b of the sector member 35.

There is further provided, on the side wall of the mirror box 10, a shaft 73 on which a V-shaped stop lever 74 is mounted for pivotal movement. This stop lever 74 is forced by a spring 75 to abut against a stop pin 76. At both ends of the stop lever 74, there are formed recesses 74a and 74b for receiving the engaging pin 33 therein, each of which recesses 74a, 74b has a guide surface 77, 78, respectively, formed in its front edge. The V-shaped stop lever 74 is adapted to maintain the light-blocking plate 12 in its initial position when the engaging pin 33 is caught in the recess 74a and in its rotated end position when the pin 33 is caught in the recess 74b, thereby maintaining the light-blocking plate 12 in one or the other position.

On the other hand, the mirror 11 is positioned in its viewing position through the engagement between the frame 20 and a stop pin 80 which is mounted on one end of a V-shaped lever 82 biased in the counterclockwise direction by a spring 81. The V-shaped lever 82 at the other end abuts against the end of an adjusting screw 83 threadedly engaged with a bent portion 10a of the mirror box 10. The adjusting screw 83 can be moved forward and rearward so as to adjust precisely the angle at which the mirror 11 must be held in its viewing position. This fine adjustment of angle is done when assembling the reflex camera, independently of the interlocking mechanism between the motor 28 to the control cam lever 41, so as to direct accurately an image toward the focusing screen 15. By adjusting the sector member 42 relative to the control cam lever 41 after the adjustment of the mirror 11 relative to the focusing screen 15, there is no play between the control cam lever 41 and the mirror swinging lever 40 so that the transmission of motion is immediately from the control cam lever 41 to the mirror swinging lever 40.

FIG. 3 shows an example of the motor control circuit for the reflex camera incorporating the above-described structure, whose operation will be described hereunder with reference to FIGS. 4 to 6. A shutter release detecting circuit 85 detects the depression of a shutter release button 18 in a well known manner to cause CPU 86 to perform a sequential operation with the aid of a program stored in ROM 87. At the moment of the detection of the depression of the shutter release button 18, the CPU 86 provides a driving signal to cause the driving means 5 to close the shutter 6. The closing of the shutter 6, which is detected by a shutter position detecting circuit 88 at a time t1 shown in FIG. 4, is followed by the provision of a high level output signal at an output terminal 86a of the CPU 86, causing a relay 90 to connect a contact 91 to a terminal 93 from an earth terminal 92 so as to render a transistor 94 conductive.

Figure 4:
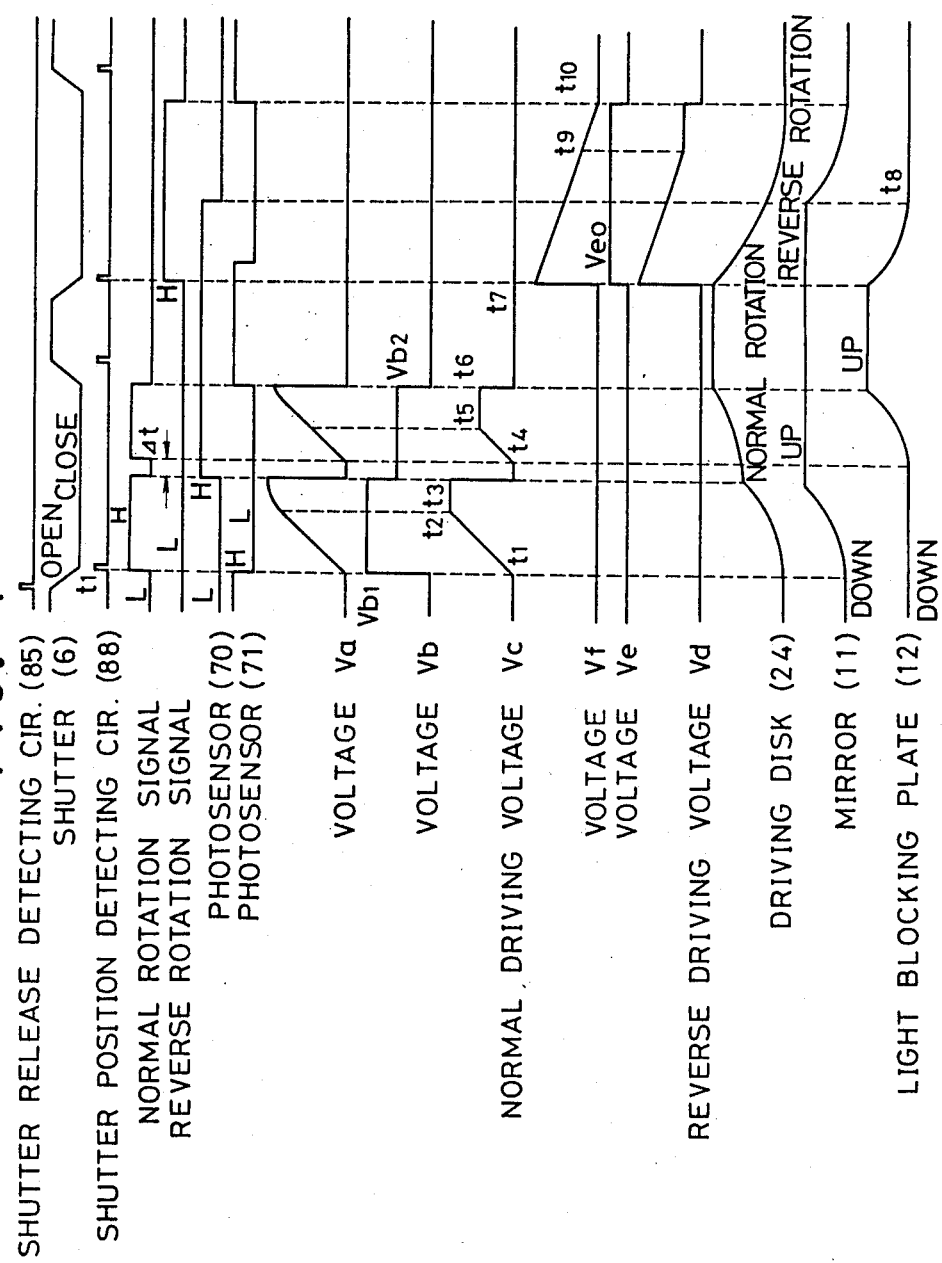
FIG. 4 is a time chart explaining the operation of the motor control circuit of FIG. 3.

As a result of this conversion of the transistor 94, a condenser 95 is changed in such a way to increase gradually a voltage Vc on a line A as is shown in FIGS. 3 and 4. On the other hand, as the photosensor 70 is, as is shown in FIG. 2, out of alignment with the sector member 35, the output signal from the photosensor 70 is at a low level L at the time t1. Therefore, a comparator 96 provides a low level of output signal at its output terminal so as to render a transistor 97 conductive. As a result, a voltage Vb (FIG. 4) on a line B (FIG. 3) is proportional to a voltage Vb1 which depends on a voltage appearing at a junction between dividing resistances 98 and 99 added to a voltage drop due to a current through the transistor 97.

In the lines A and B there are diodes 101 and 102 connected parallel to each other and to an operational amplifier 104 at its one input terminal. Owing to the parallel connection of the diodes 101 and 102, the operational amplifier 104 at its output terminal provides a voltage corresponding to the lower of Va and Vb. As a result, a voltage Vc for rotating the motor 28 in a normal direction provided at a junction C increases linearly in proportion to the increasing voltage Va on the line A between the times t1 and t2 during which the voltage Vb is always higher than the voltage Va, and then becomes a constant voltage proportional to the voltage Vb1 on the line B.

When the motor 28 is supplied with the voltage Vc having a waveform as described above, the motor 28 rotates in a normal direction at a slow speed at the beginning, and then at a gradually increasing speed, and the driving disk 24 is rotated at a correspondingly increased speed. As a result of this rotation of the driving disk 24, the pin 33 in the recess 74a of the stop lever 74 forces the stop lever 74 to turn counterclockwise against the force of the spring 75 and rides over the guide surface 77 of the recess 74a, escaping from the recess 74a. Therefore, the driving disk 24 can continue to rotate in the counterclockwise or normal direction without being restricted by the stop lever 74. It should be noted that the photosensor 71 provides a high level signal H when the sector member 35 is in its initial position shown in FIG. 2 and a low level signal L at the moment the sector member 35 is moved as a result of the rotation of the driving disk 24.

The mirror engaging pin 32, whose turning results from the counterclockwise rotation of the driving disk 24, moves in the curved cam slot 48b toward the end thereof from its initial position shown by a double dotted line in FIG. 4 wherein the pin 32 engages the cam slot 48 at the junction of the arc-shaped cam slot 48a and the curved cam slot 48b so as to swing up the control cam lever 41 counterclockwise. Because 48a and 48b are tangential to each other at their junction, the cam control lever 41 is swung up smoothly at the beginning of the rotation of the driving disk 24. As is apparent from the above, the driving disk 24 can start its rotation without receiving any shock from the motor 28 and the control cam slot 48.

The swinging-up movement of the control cam lever 41 results in upward or counterclockwise rotation of the mirror swinging lever 40 through the engagement between the raised lug 40a and the adjustable sector 42, followed by the swinging-up movement of the frame 20 carrying the mirror 11 through the engagement between the pin 50 and the slot 49 of the mirror swinging lever 40 moving to its upper position. During the normal rotation of the driving disk 24, the engagement pin 32 moves toward the junction of the cam slots 48a and 48b after having reached the closed end of the curved cam slot 48b. When the engaging pin 32 returns to the junction of the cam slots 48a and 48b, the mirror swinging lever 40 and the cam lever 41 are moved to the upper position shown in FIG. 5, swinging the mirror 11 up to the photographing position wherein the mirror 11 is completely out of the light path 14. At the same time, the pin 50 projecting from the frame 20 turns the locking lever 66 clockwise so as to release the pin 60 from the locking lever 66, rendering the light-blocking plate 12 movable.

Figure 5:
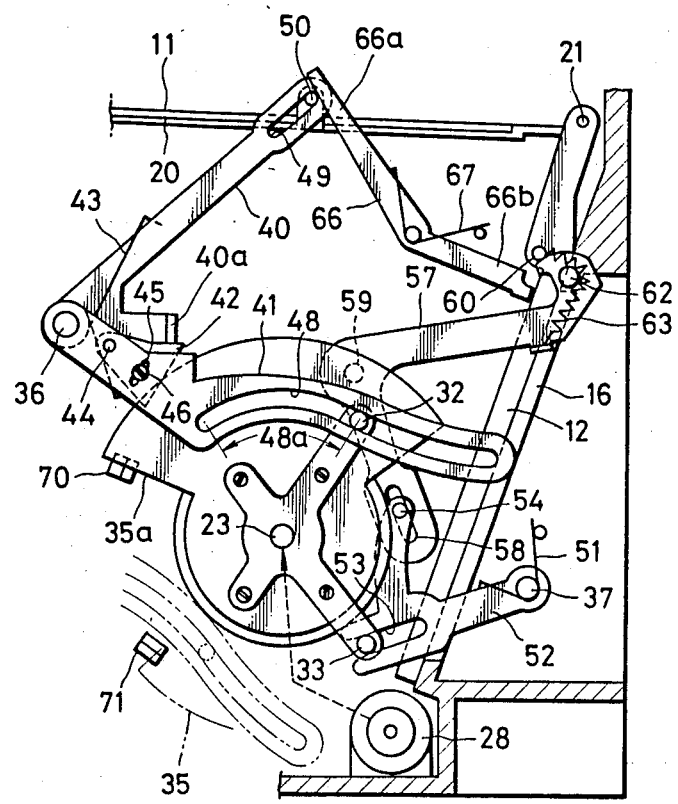
FIG. 5 is a side view showing the driving mechanism of FIG. 2 operated to swing up the mirror.
Figure 6:
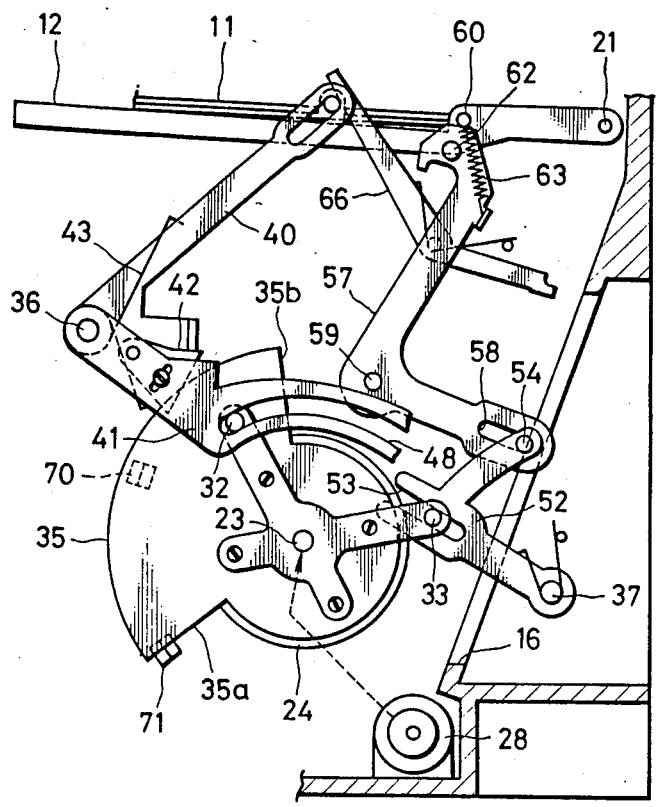
FIG. 6 is a side view similar to FIG. 5 showing the driving mechanism of FIG. 2 operated to swing up the light-blocking plate.

At a time t3 when the mirror 11 is swung up to the photographing position shown in FIG. 5, the photosensor 70 detects the leading edge 35a of the sector member 35 and provides a high level signal L as a timing signal indicating the completion of the swinging-up of the mirror 11. The signals from the photosensors 70 and 71 are also transmitted to the CPU 86. When the timing signal is transmitted to the CPU 86 at the time t3, the CPU 86 at its output terminal 86a is caused to change its output signal from a high level to a low level for a period of time, $\Delta t$, for example about 15 m sec.

In the absence of a high level signal L which allows the motor 28 to rotate in its normal direction, the relay 90 is turned off to allow the contact 91 to connect to the earth terminal 92. Consequently, the motor 28 stops quickly, terminating the rotation of the driving disk 24. On the other hand, when the photosensor 70 provides a high level signal H, the comparator 96 provides a high level signal H at its output terminal, rendering the transistor 97 non-conductive. As a result, the voltage Vb on the line B falls to a voltage proportional to the voltage Vb2 (lower than the voltage Vb1) which depends on the values of the resistances 98, 99.

After the period of time, $\Delta t$, the CPU 86 provides a normal rotation signal of high level H at its output terminal 86a at a time t4, causing the relay 90 to turn on so as to move the contact 91 into contact with the terminal 92. Consequently, the motor 28 restarts to rotate in its normal direction under the influence of the voltage Vc as a normal driving signal at the junction C. The voltage Vc, as described above, gradually increases in proportion to the voltage Va on the line A and becomes a constant value proportional to the voltage Vb2 after a time t5 when the voltage Va has become equal to or higher than the voltage Vb.

The rotation of the motor 28 in the normal direction under the influence of the normal driving voltage Vc causes again the driving disk 24 to rotate in the counterclockwise direction so that the engaging pin 32 enters into and moves within the arc-shaped cam slot 48a without moving the mirror swing-up lever 40 and the cam lever 41 up or down, thereby holding the mirror 11 in the photographing position.

As a result of the resumption of rotation of the driving disk 24, the engaging pin 33 enters into and moves within the slot 53 of the cooperating lever 52 so as to turn the linking lever 52 clockwise against the spring 51. Consequently, the swinging lever 57 is swung up counterclockwise about the shaft 59 through the engagement between the pin 54 and the slot 58 to push up the pin 60 by the edge portion 61 thereof, so as to swing the light-blocking plate 12 about the shaft 21 for opening the exposure aperture 16 in the mirror box 10. At the beginning of this reastart of the driving disk 24 for swinging up the light-blocking plate 12, there is no shock between the engaging pin 33 and the cooperating lever 52, which results from the gentle increase of the speed of rotation of the motor 28. Because the load on the motor 28 is less when swinging up the light-blocking plate 12 than when swinging up the mirror 11, the maximum level of the normal driving voltage Vc necessary for the normal rotation of the motor 28 after the time t4 is set to a voltage proportional to the voltage Vb2 which is lower than the voltage Vb1 drawn by the motor 28 when swinging up the mirror 11. Accordingly, the reaction force which is exerted on the light-blocking plate 12 at the moment the motor 28 stops is controlled to be lower than that at the time t3. This lower force is highly advantageous in applications wherein an exposure is commenced immediately after the swinging-up of the light-blocking plate 12.

With the continuous rotation of the driving disk 24 as a result of the rotation of the motor 28 which is caused by the driving voltage Vc for normal rotation proportional to the voltage Vb2, the light-blocking plate 12 is swung up and out of the light path 14 as shown by a double-dotted line in FIG. 1 to open the exposure aperture 16. Simultaneously with this operation, as is shown in FIG. 6, the photosensor 71 detects the leading edge 35a of the sector member 35 to provide a high level signal H as a timing signal indicating the completion of swinging-up of the light-blocking plate 12. At a time t6 when the timing signal is transmitted to the CPU 86, the normal rotation signal at the output terminal 86a of the CPU 86 extinguishes so that the relay 90 is turned off to move the contact 91 from the terminal 93 to the earth terminal 92. Consequently, the motor 28 stops.

In order to avoid excessive rotation of the driving disk 24 due to the rotational inertia of the motor 28 upon stopping, the driving disk 24 is restricted in its rotated position by the stop lever 74. Specifically, when the engaging pin 33 approaches the stop lever 74, the engaging pin 33 strikes the stop lever 74 on its guide surface 78 to force it back, entering the recess 74b. Consequently, the engaging pin 33 is mechanically braked. Owing to this mechanical braking in association with the above-described control of the normal rotation voltage Vc, no shock is induced when the engaging pin 33 is engaged and stopped by the stop lever 74 in its recess 74b.

The high level signal H from the photosensor 71 serves as a signal indicating the completion of swinging up of the light-blocking plate 12 to cause the CPU 86 to provide a signal which actuates the driving means 5. Therefore, the presence of the high level signal H allows the shutter 6 to open for a predetermined exposure time and then to close to end the exposure. When the shutter 6 closes at a time t7, the shutter position detecting circuit 88 provides a signal indicating the completion of the exposure operation of the shutter 6 which causes the CPU 86 to render its output at the reverse rotation signal terminal to be at a high level. Consequently, a relay 112 is actuated to connect the contact 114 to a terminal 116 from an earth terminal 115, causing the motor 28 to rotate in the reverse direction under the influence of a reverse driving voltage Vd at a junction D. The voltage Vd at the junction D is in proportion to an output voltage from an operational amplifier 117 which is the higher of the voltages Ve and Vf appearing on lines E and F, respectively. The voltage Vf gradually drops with the charging of the condenser 123, while the voltage Ve is set equal to a constant voltage Veo which is determined by dividing resistances 118 and 119. Specifically, because a transistor 121 is rendered non-conductive when a transistor 120 is rendered conductive by the presence of a reverse driving signal, the voltage Vf which was previously kept constant with the aid of a resistance 122, drops gradually with the charge of the condenser 123; and because the operational amplifier 117 is adapted to provide an output voltage proportional to the voltage which is the higher of the two voltages Ve, and Vf, the voltage Vd at the junction D, as is shown in FIG. 4, gradually drops and becomes constant at a time t9 when the two voltages Ve and Vf become equal.

Once the motor 28 is caused, under the influence of reverse driving voltage Vd, to rotate in the reverse direction, then the motor 28 continues to rotate at a decreasing speed. Consequently, the driving plate 24 is rotated in the clockwise direction, causing the linking lever 52 to turn about the shaft 37 in the counterclockwise direction through the engagement between the engaging pin 33 and the slot 53. Consequently, the light-blocking plate swinging lever 57 is turned about the shaft 59 counterclockwise, returning the light-blocking plate 12 from the position shown in FIG. 6 to the position shown in FIG. 5 so as to close the exposure aperture 16. As is shown in FIG. 5, upon the light-blocking plate 12 closing the exposure aperture 16, the pin 62 of the light-blocking plate swinging lever 56 pushes and crooks the spring 63 at its midportion so as to hold resiliently the light-blocking plate 12 in a position wherein the light-blocking plate 12 closes the exposure aperture 16 completely.

Because the engaging pin 32 moves within the circular arc cam slot 48a until the light-blocking plate 12 is returned completely, the control cam lever 41 and the mirror swinging lever 40 are maintained in the position shown in FIG. 5. At the time t8 when the driving disk 24 rotates in the reverse direction to return the light-blocking plate 12 to the position wherein it closes the exposure aperture 16 completely, the photosensor 70 detects the leading edge 35a of the sector member 35 to provide a high level signal H which is available as a signal indicating, for example, the completion of return of the light-blocking plate 12.

In the course of the continuous rotation of the driving disk 24 with a decreasing speed, the engaging pin 32 leaves the circular arc cam slot 48a and enters and moves within the curved cam slot 48b so as to turn the mirror swinging lever 40 and the control cam lever 41 clockwise about the shaft 36. Consequently, through the engagement between the slot 49 and the pin 50, the frame 20 is swung down until stopped by the stop pin 80, when it is in the viewing position. At a time t10 when the CPU 86 receives the timing signal, the CPU 86 changes its reverse driving signal at the output terminal 86a to a low level L, turning the relay off to connect the contact 114 to the earth terminal 115 so as to stop the motor 28 and hence the driving disk 24. At this time, because the normal driving voltage Vc for the motor 28 gradually decreases and then assumes a low level, the driving disk 24 is rotated at a gradually decreasing speed and then at a constant speed. Consequently, the kinetic energy of the driving disk 24 and its associated members such as the control cam lever 41, the mirror swinging lever 40 etc., the mirror 11 and the like is decreased, and so only considerably reduced shocks are imposed on these members. Because the reverse driving voltage Vd is not only decreased gradually to a predetermined level of voltage but also maintained at the decreased level of voltage toward the end of swinging movement of the mirror 11, the mirror 11 and its associated movable members will be certain to return to their predetermined position.

When the driving disk 24 stops, the stop lever 74 acts on the driving disk 24 so as to place the mirror 11 in position. Specifically, when the pin 33 moves toward the initial position shown in FIG. 1, the pin 33 abuts the front edge of the guide surface 77 which is inclined to the path of the pin 33, turning the stop lever 74 counterclockwise against the spring 75 to ride over the same, so that the pin 33 enters into the recess 74a to stop the driving disk 24 in a predetermined angular position. At this time, the front edge of the guide surface 77 acts as a buffer for the pin 33 so as to absorb shocks, thereby to decrease vibrations which the driving disk 24 is apt t produce when stopping.

When the CPU 86 receives a timing signal produced at a time t10, the CPU 86 provides an actuation signal for the control circuit of the shutter driving means 5. Under the influence of the actuation signal, the shutter 6, which has been closed after an exposure, is again opened. As the light-blocking plate 12 covers the exposure aperture 16 prior to the opening of the shutter 6, the film 7 in the film back 3 is never inadvertently exposed to light. With the clockwise movement of the mirror swinging lever 40, the lock lever 66 turns counterclockwise to retain the light-blocking plate 12 in its swung down position.

Upon the completion of return movement of the mirror 11 and the light-blocking plate 12 to the photographing position, the CPU 86 provides an actuation signal which is transmitted to the motor driving circuit 126 in the film back 3 to start the motor 8, advancing the film 7 by one frame through a film advancing mechanism well known in the art. When the one-frame advancement of the film 7 is detected by a detecting circuit 128, the motor 8 is stopped. In this manner, a photographic sequence is performed and the reflex camera becomes ready for another exposure.

Although the above description is given for the operation of the motor 28 in a usual photographic sequence, it is permissible to perform the mirror swinging-up movement between the times t1 and t6 and the mirror swinging-down movement between the times t7 and t10 by using sub-routines, respectively, in the same photographic sequence. Therefore, these mirror movements can be carried out by interrupt handling instructions to be transmitted to the CPU 86. For these interrupt handling instructions, it is desirable to provide in the reflex camera a mirror swinging-up button and a mirror swinging-down button, each of which is adapted to produce an electric signal as the interrupt handling instruction upon being operated. The interrupt handing, for example, of mirror swinging-up movement is carried out only when it is confirmed based on a particular combination of signals from the photosensors 70 and 71 that the mirror 11 is in the viewing position.

It is also permissible to use, in place of the sector member 35, a reflection free disk member which is provided with light-reflective members so disposed thereon at particular angular positions as to be detected by the photosensors 70 and 71. Alternatively, the reflection-free disk may be formed with light-transmitting parts such as slits at the particular angular positions in place of the light-reflective members. If desired, the photosensor may be replaced with other non-contact switches such as magnetically operated switches which can detect the approach of the sector member 35, or with mechanical contact switches such as micro-switches, slidable contact switches, etc. if it is permissible to make a mechanical contact between the switch and the sector member 35. It is advantageous to modify the shape of the sector member 35, and in particular the form of the edges 35a and 35b, so as to have a variety of choices of where to locate the position detecting devices independently of the locations of the mirror 11 and the light-blocking plate 12.

Although the present invention has been fully described by way of a preferred embodiment thereof with reference to the accompanying drawings, it is to be noted that the possibility of various changes and modifications will be apparent to those skilled in the art. Therefore, unless otherwise such changes and modifications depart from the scope of the present invention, they should be construed as being included therein.

What is claimed is:

1. A reflex camera having a reflex mirror and a light-blocking plate which are pivotally mounted in the reflex camera for swinging-up and -down movement between a viewing position and a photographic position, said reflex camera comprising:

an electric motor disposed in said reflex camera;
   driving means coupled to said electric motor for rotary movement;
   interlocking means coupled between said driving means and both said reflex mirror and said light-blocking plate for sequentially swinging up and down said mirror and light-blocking plate between said two positions;
   position-detecting means for detecting rotated angular positions of said driving means to provide position signals as electric outputs; and
   means for controlling the rotation of said motor in accordance with said position signals, thereby to control said swinging-up and -down movement of said mirror and light-blocking plate.

2. A reflex camera as defined in claim 1, said positioning-detecting means provides at least three position signals, namely a first position signal at the end of swinging-up movement of said mirror to said photographing position, a second position signal at the end of swinging-up movement of said light-blocking plate to said photographing position, and a third position signal at the end of swinging-down movement of said mirror to said viewing position.

3. A reflex camera as defined in claim 1, wherein said position-detecting means comprises a member attached to said driving means at a particular angular position thereof and means stationarily disposed in said reflex camera for sensing said member.

4. A reflex camera as defined in claim 1, wherein said position-detecting means comprises a sector member having a leading and a trailing edge which is attached to said driving means and two position sensors which are actuated by said sector member to provide said position signals.

5. A reflex camera as defined in claim 4, wherein said sector member is a light-reflective plate and said position sensor is a reflection-type photosensor.

6. A reflex camera having a reflex mirror and a light-blocking plate which are pivotally mounted in the reflex camera for swinging-up and -down movement between a viewing position and a photograhing position, said reflex camera comprising;

driving means including an electric motor for swinging up and down said reflex mirror and said light-blocking plate sequentially; and
   control means for maintaining a driving voltage supplied to said electric motor lower upon the swinging-up movement of said reflex mirror to said photographing position than upon the swinging-up movement of said light-blocking plate to said photographing position.

7. A reflex camera as defined in claim 6, wherein said voltage upon the swinging-up movement of said light-blocking plate gradually increases to and is thereafter kept at a predetermined level.

8. A reflex camera as defined in claim 6, wherein said voltage supplied to said motor is cut off before swinging up said light-blocking plate after having swung up said reflex mirror to said viewing position.

9. A reflex camera having a reflex mirror and a light-blocking plate which are pivotally mounted therein for swinging-up and -down movement between a viewing position and a photographing position, said reflex camera comprising:
   driving means including an electric motor for swinging up and down said mirror and said light-blocking plate sequentially; and
   means for controlling a driving voltage supplied to said electric motor in such a way that said driving voltage is gradually increased to and kept at a predetermined level of voltage during swinging up said mirror from said viewing position to said photographing position, and so that said driving voltage is then cut off for a predetermined period of time upon having swung said mirror up to said photographing position and so that said driving voltage is gradually increased again to and kept at a predetermined level of voltage after said predetermined period of time during swinging up said light-blocking plate from said viewing position to said photographing position, and so that said driving voltage is cut off again upon having swung up said light-blocking plate.

10. A reflex camera having a reflex mirror which is pivotally mounted therein for swinging-up and -down movement between a viewing position and a photographing position, said reflex camera comprising:
   driving means including an electric motor for causing said swinging-up and -down movement; and
   control means for decreasing gradually a driving voltage supplied to said electric motor to and keeping it at a predetermined level of voltage during said swinging-down movement of said mirror from said photographing position to said viewing position, and then cutting off said driving voltage at the end of said swinging-down movement of said mirror.

* * * * *